(12) United States Patent
Craciun

(10) Patent No.: US 10,864,893 B2
(45) Date of Patent: Dec. 15, 2020

(54) ACCESS ARRANGEMENT FOR A VEHICLE

(71) Applicant: Continental Automotive GmbH, Hannover (DE)

(72) Inventor: Serban Craciun, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/638,069

(22) PCT Filed: Aug. 9, 2018

(86) PCT No.: PCT/EP2018/071664
§ 371 (c)(1),
(2) Date: Feb. 10, 2020

(87) PCT Pub. No.: WO2019/030339
PCT Pub. Date: Feb. 14, 2019

(65) Prior Publication Data
US 2020/0216030 A1 Jul. 9, 2020

(30) Foreign Application Priority Data

Aug. 11, 2017 (EP) .................................. 17465536

(51) Int. Cl.
*B60R 25/00* (2013.01)
*B60R 25/40* (2013.01)
(Continued)

(52) U.S. Cl.
CPC ............ *B60R 25/403* (2013.01); *B60R 25/24* (2013.01); *E05B 81/56* (2013.01); *E05B 81/82* (2013.01);
(Continued)

(58) Field of Classification Search
CPC ........ B60R 2325/103; B60R 2325/205; B60R 25/24; B60R 25/403; E05B 81/56;
(Continued)

(56) References Cited

U.S. PATENT DOCUMENTS 5,497,641 A  3/1996 Linde et al.
2005/0062453 A1  3/2005 Sato
(Continued)

FOREIGN PATENT DOCUMENTS

DE  102005054111 A1  5/2007
DE  102013007154 A1  11/2013
(Continued)

OTHER PUBLICATIONS

European Search Report dated Feb. 9, 2018 from corresponding European Patent Application No. EP 17465536.5.
(Continued)

*Primary Examiner* — Naomi J Small

(57) ABSTRACT

An access arrangement for a vehicle comprises a vehicle-side unlocking device for actuating an unlocking mechanism and a vehicle-side rechargeable electrical energy storage device configured to supply the unlocking device with energy. Furthermore, it comprises a vehicle-side charged electrical energy storage device configured to charge the vehicle-side rechargeable electrical energy storage device. The access arrangement further comprises a charging control device for controlling the charging process of the vehicle-side rechargeable electrical energy storage device by the vehicle-side charged electrical energy storage device. Finally, it comprises a vehicle-side authentication device for checking an access authorization and for controlling the charging control device depending on the checking of the access authorization. By providing an energy storage device which is already charged, independent of the vehicle elec-
(Continued)

trical system, unlocking can be carried out quickly in the event of failure of the vehicle electrical system in an emergency running state.

18 Claims, 1 Drawing Sheet

(51) Int. Cl.
    *H02J 7/00*                (2006.01)
    *B60R 25/24*             (2013.01)
    *E05B 81/56*             (2014.01)
    *E05B 81/82*             (2014.01)
    *H02J 7/34*               (2006.01)
    *H02J 7/35*               (2006.01)

(52) U.S. Cl.
    CPC .......... *H02J 7/00045* (2020.01); *H02J 7/345* (2013.01); *H02J 7/35* (2013.01); *B60R 2325/103* (2013.01); *B60R 2325/205* (2013.01); *E05Y 2400/85* (2013.01); *E05Y 2900/531* (2013.01); *H02J 2207/20* (2020.01)

(58) Field of Classification Search
    CPC ................ E05B 81/82; E05Y 2400/85; E05Y 2900/531; G07C 2009/00634; G07C 2009/00769; G07C 9/00309; H02J 2207/20; H02J 7/00045; H02J 7/345; H02J 7/35
    USPC ........................................................ 340/5.72
    See application file for complete search history.

(56) References Cited

U.S. PATENT DOCUMENTS

| | | |
|---|---|---|
| 2012/0108168 A1 | 5/2012 | Metivier |
| 2013/0311046 A1 | 11/2013 | Heberer et al. |
| 2016/0180618 A1* | 6/2016 | Ho ................ G07C 9/00563 340/5.52 |
| 2016/0325636 A1* | 11/2016 | Masuda ................ B60L 58/20 |
| 2017/0002586 A1* | 1/2017 | Lee ................ G07C 9/00817 |
| 2017/0101076 A1 | 4/2017 | Krishnan |
| 2018/0351388 A1* | 12/2018 | Orris ................ B60R 16/03 |

FOREIGN PATENT DOCUMENTS

| | | |
|---|---|---|
| DE | 202013103042 U1 | 10/2014 |
| DE | 202016105621 U1 | 11/2016 |
| EP | 0584499 A1 | 3/1994 |
| WO | 2010/125306 A2 | 11/2010 |

OTHER PUBLICATIONS

International Search Report and Written Opinion dated Oct. 22, 2018 from corresponding International Patent Application No. PCT/EP2018/071664.

* cited by examiner

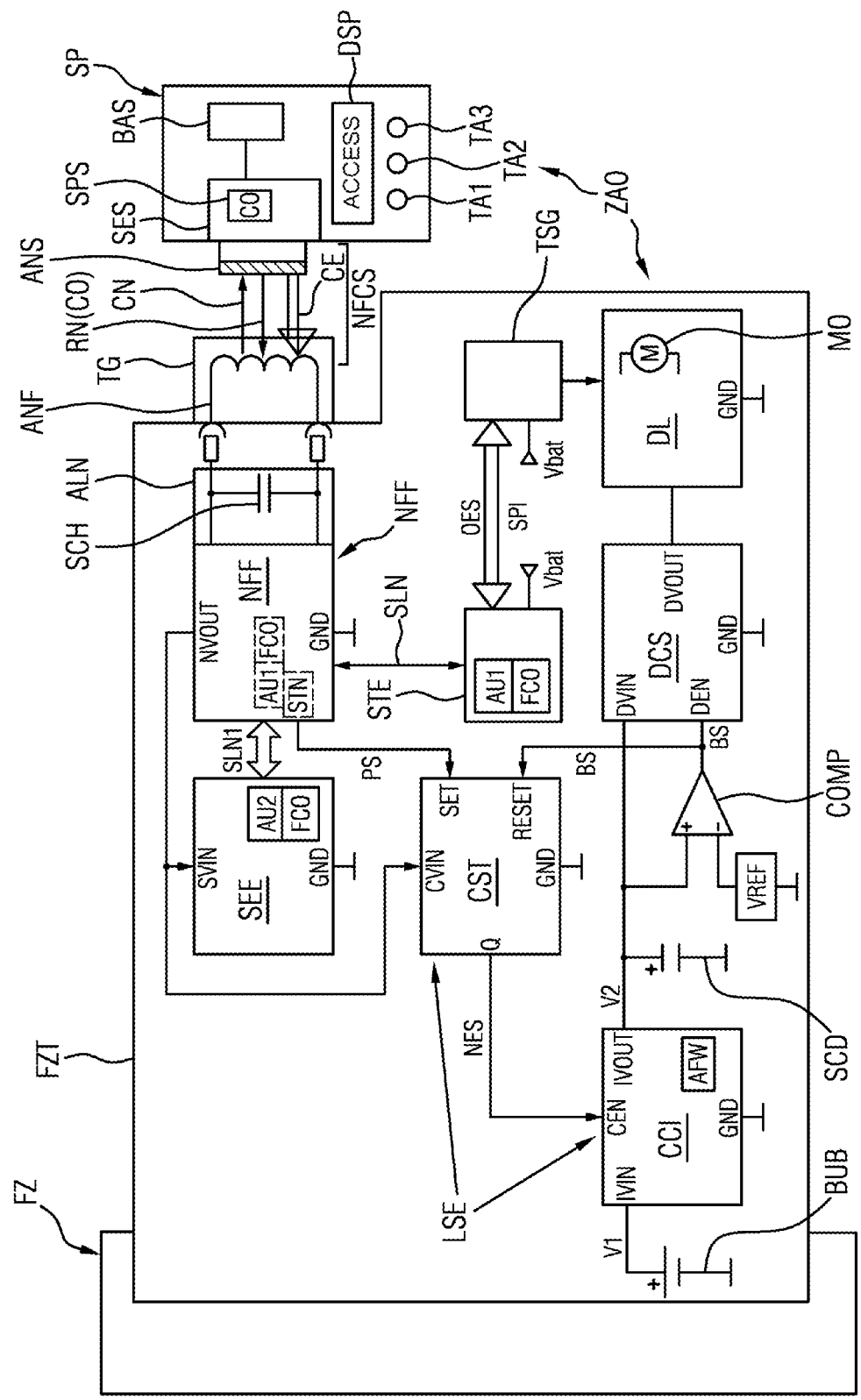

ACCESS ARRANGEMENT FOR A VEHICLE

The present invention relates to an access arrangement for a vehicle, in particular in order to be able to carry out emergency unlocking of the vehicle in the event of failure of the vehicle electrical system. The invention further relates to a vehicle with an access arrangement just mentioned.

In order to prevent unauthorized access to a vehicle, particularly a motor vehicle, modern access authorization systems or access arrangements in vehicles use electronic security systems, in which, to authenticate a user, data communication takes place between a first communication device on the vehicle side and a second vehicle communication device in a mobile identification transmitter of the user, such as a key or a key fob. In this case, in an active access arrangement, the mobile identification transmitter transmits control signals and an identification signal to the vehicle, for example by the user of the mobile identification transmitter pressing a corresponding button, whereupon this vehicle is unlocked or locked if the identification code is correct.

In a so-called passive access arrangement, request signals with a certain field strength are initially sent out at regular time intervals by a first communication device of the vehicle, in order to check whether a mobile identification transmitter is located in an approach region or in an access region (unlock zone) around the vehicle. If a mobile identification transmitter approaches the vehicle and is finally able to receive the request signals thereof, it will respond to the reception of a request signal in order to initiate an authentication process.

In this case, data telegrams are exchanged, in which the second mobile identification transmitter transmits its authentication code to the vehicle. If the authentication code is checked successfully, it is then possible for a user, who is located directly at the vehicle in the access region, to initiate unlocking of the corresponding vehicle door or all vehicle doors by actuating a door handle. As no active actuation of a mechanical or electrical identification transmitter or key by a user has to take place here, this type of access authorization checking is also termed passive access authorization checking and the corresponding access authorization systems are termed passive electronic access authorization systems or passive access arrangements.

As just mentioned, it is necessary, particularly for passive access arrangements, for a vehicle-side communication device to send out signals to the mobile identification transmitter of the user. However, this is no longer possible in the case where the electrical system of the vehicle (fed by a vehicle battery) fails, said system generally supplying the vehicle-side communication device with energy. One possibility for failure can stem from the fact that the vehicle battery supplying the vehicle electrical system is empty or no longer provides a sufficient voltage. For this purpose, it is conceivable to provide a mobile identification transmitter with a mechanical emergency key which makes it possible to open the vehicle by way of a mechanical closing device on the vehicle. In order that the closing device can be opened manually, such an emergency key can have, alongside the key bit, a sufficiently large key head in order that the torque required for opening the closing mechanism can be applied. However, a key head dimensioned in this way takes up a considerable amount of structural space in the identification transmitter, with the result that, disadvantageously, the dimensions of the identification transmitter are crucially determined and enlarged by said emergency key or key head. Such a volume of an identification transmitter is usually undesirable, however, since in many cases such identification transmitters are also kept in pockets of a user's clothes and thus result in bulging of the pockets.

The object of the present invention is therefore to create a possible way of providing access to the vehicle in the event of failure of the vehicle-side power supply even without an emergency key.

This object is achieved by means of the subjects of the independent claims. The dependent claims relate to advantageous configurations.

According to a first aspect of the invention, an access arrangement for a vehicle, in particular a motor vehicle, comprises a vehicle-side unlocking device for actuating, in particular unlocking, a locking mechanism of the access arrangement. Furthermore, it comprises a vehicle-side rechargeable electrical energy storage device which is set up to supply the unlocking device with energy. In addition, it comprises a vehicle-side charged electrical energy storage device which is set up to charge the vehicle-side rechargeable electrical energy storage device. It is possible here that the vehicle-side rechargeable electrical energy storage device is not connected to the on-board power supply of the vehicle, but is independent of it. It is also possible that the vehicle-side charged electrical energy storage device is not connected to the on-board power supply of the vehicle. The access arrangement further comprises a charging control device for controlling the charging process of the vehicle-side rechargeable electrical energy storage device by the vehicle-side charged electrical energy storage device. Finally, the access arrangement has a vehicle-side authentication device for checking and in particular also implementing an access authorization and for controlling the charging control device depending on the checking of the access authorization. The provision of the vehicle-side charged electrical energy storage device and the possibility of specifically charging the vehicle-side rechargeable electrical energy storage device in an "emergency operating state", in which the vehicle-side electrical system or the vehicle battery provides no energy or no longer provides sufficient energy, make it possible for the vehicle-side unlocking device to also be actuated in this "emergency operating state" without a separate emergency key.

According to one configuration, the vehicle-side charged electrical energy storage device can be a galvanic cell, in particular in the form of a primary cell, i.e. a non-rechargeable primary cell or battery.

According to a further configuration, the vehicle-side rechargeable electrical energy storage device can have a rechargeable battery, i.e. a rechargeable galvanic cell or secondary cell. However, it is also conceivable for it to have a capacitor, preferably in the form of a supercapacitor or ultracapacitor, which in particular has a high power density and can be quickly charged and discharged.

According to a further configuration, the charging control device comprises a DC-DC converter in the form of a step-up converter in order to convert a first voltage provided by the charged vehicle-side electrical energy storage device into a second voltage higher than the first for charging the vehicle-side rechargeable electrical energy storage device. In this way, it is possible to use a battery as a charged energy storage device in order to quickly charge a supercapacitor, for example, via the step-up converter, so that the unlocking device can be actuated via said supercapacitor.

According to a further configuration of the access arrangement, it also comprises a vehicle-side energy supply device with the following features. This has a first section for receiving wirelessly transmitted energy and for converting the transmitted energy into electrical energy. It also has a second section for supplying the vehicle-side authentication device with the electrical energy. In this way, it is possible for the authentication device, for example in the event of complete failure of the vehicle-side electrical system or vehicle battery, to also be able to be supplied from the outside by means of the vehicle-side energy supply device by transmitting energy.

According to a further configuration of the access arrangement, it also has a further (second) vehicle-side rechargeable electrical energy storage device which is connected to the second section of the vehicle-side energy supply device in order to be charged. In this context, it is also conceivable for the further vehicle-side rechargeable electrical energy storage device to also be set up to supply the vehicle-side authentication device with energy. As a result of such a construction, it is then conceivable for the vehicle-side authentication device to either be supplied with energy directly from the second section of the vehicle-side energy supply device or via the further vehicle-side rechargeable electrical energy storage device, which in turn is supplied with energy or charged via the second section of the vehicle-side energy supply device.

According to a further configuration of the vehicle-side energy supply device, this has a radio interface. It is conceivable here for such a radio interface to be designed as a low-frequency radio interface that operates at frequencies of approximately 125 kHz. In particular, however, it is also conceivable for such a radio interface to be designed in the form of a short-range radio interface or NFC (Near Field Communication) interface in order to receive energy transmitted wirelessly by radio. As will be explained in yet more detail later, such energy can be provided by an identification transmitter assigned to the access arrangement.

According to a further configuration, the vehicle-side energy supply device can also comprise a light interface. It is conceivable, in particular, for this light interface to be designed in the form of a photocell (solar cell) in order to receive energy transmitted wirelessly by means of light, in particular from an identification transmitter assigned to the access arrangement. In this case, the light can come from a luminous means of the identification transmitter, such as an LED (Light Emitting Diode). In particular when the mobile identification transmitter is designed as a mobile phone or smartphone, an activated flashlight function or flash function can be used to provide the light used for the energy supply. Alternatively, the energy could also come from another light source, for example from a separate flashlight or even the sun. If sunlight is used, it is also conceivable for authentication and/or unlocking to be able to take place if both the vehicle and the identification transmitter no longer have a sufficient battery charge. In this case, the user must then wait until the sun is shining or until the sun has used a vehicle-side photocell/solar cell, as the first section of the energy supply device, to charge the further vehicle-side rechargeable energy storage device or to provide the vehicle-side authentication device with sufficient energy. During energy transmission, light could also be used for communication for an authentication process. In particular, light in the infrared (IR) range is also possible here.

According to a further configuration of the access arrangement, the vehicle-side authentication device for implementing the access authorization outputs an unlock signal to the vehicle-side unlocking device for unlocking a locking mechanism. In particular, it is assumed here that checking by the authentication device has given a positive result. For example, this means that a mobile identification transmitter assigned to the access arrangement has sent its code to the authentication device for the authentication check, this code being compared with a code stored in the authentication device and a match of the transmitted code and the stored code resulting in a positive authentication result, and then in particular in unlocking.

According to a further configuration of the access arrangement, it comprises a mobile identification transmitter for outputting or providing the energy to be wirelessly transmitted to the vehicle-side energy supply device. This mobile identification transmitter can be configured in such a way that it can be carried with or by a user and is designed as a key, a key fob, a mobile phone, in particular a smartphone (intelligent telephone), or as a fitness tracker (fitness monitoring device, particularly worn around the wrist) etc. In this way, the user can, for example, also use an object of his daily life to carry out emergency unlocking of the vehicle if the vehicle's own electrical system fails.

It is also conceivable for the mobile identification transmitter, with which the emergency unlocking is possible, to also be set up to communicate with the vehicle-side authentication device in order to authenticate the mobile identification transmitter at the access arrangement or at the vehicle. As already described above, authentication can take place by exchanging one or more identification codes between the mobile identification transmitter and the vehicle-side authentication device and comparing it/them with predetermined or stored codes.

According to a further aspect of the invention, a vehicle with an access arrangement described above or a configuration thereof is provided. In this case, the vehicle can have at least one vehicle door in which the components of the access arrangement are arranged. It is also conceivable for the vehicle door to have a door handle in which the vehicle-side energy supply device or at least the first section of the vehicle-side energy supply device is provided.

Details and advantageous configurations of the access arrangement described above can also be regarded as advantageous configurations of the vehicle, and vice versa, insofar as they can also be applied to the vehicle.

Exemplary embodiments of the present invention will now be explained in greater detail below with reference to the accompanying drawing. In the drawing:

FIG. 1 shows a schematic illustration of the essential components of an access arrangement according to an embodiment of the invention.

Reference shall now be made to FIG. 1 which shows an access arrangement ZAO which is designed for use in a vehicle FZ, in particular a motor vehicle. In this case, the access arrangement ZAO comprises a vehicle-side part accommodated in the vehicle FZ, in particular in a door FZT of the vehicle. As can be seen on the right-hand side of the FIGURE, the access arrangement ZAO furthermore has a mobile part formed by a mobile identification transmitter, here in the embodiment of a smartphone (intelligent telephone) SP.

During normal or correct operation of the access arrangement, in which a vehicle-side battery (not illustrated) supplies an electrical system of the vehicle with power so that the essential components are supplied with the battery voltage Vbat, a vehicle-side control device STE (for example in the form of a microcontroller) will send a signal via a control line SLN to a vehicle-side transceiver NFF, which then sends out request signals CN at regular time intervals. However, it is also conceivable that, instead of a control device STE (outside the vehicle-side transceiver), a control device STN integrated in the vehicle-side transceiver takes over the task of the control device STE. In the present case, the vehicle-side transceiver is an NFC module or an NFC reader NFF, which is incorporated adjacent to or at least partly in a door handle TG of the vehicle door FZT. Said NFC reader NFF will then send out radio signals, in particular with a short range of approximately 10 cm, as request signals CN. These radio signals for request and as a response are in a frequency range according to an NFC standard, in particular at 13.56 MHz.

If there is now a radio counterpart, such as the smartphone SP, within the range of the request signals CN, it will respond to these request signals CN with one or more response signals RN. To exchange these request and response signals, there is the vehicle-side (NFC) antenna ANF on the vehicle side (as part of the vehicle-side transceiver) and the smartphone-side (NFC) antenna ANF is located on the smartphone SP side, which together form an NFC interface NFCS.

The request signals CN are received by the smartphone-side antenna ANS and conducted to a smartphone-side transceiver SES. The latter comprises a storage device SPS, in which an identification code CO is stored. This code is packaged by the transceiver SES in a response signal RN, with the result that the identification code CO is transmitted back to the vehicle, more precisely to the antenna ANF. From there, the code is conducted once again via the control line SLN to the vehicle-side control device STE, and there it is checked by an authentication section AU1. During this check, the authentication code CO is compared with a code FCO stored in the authentication section AU1, wherein a positive result is obtained if the code matches.

In the event of a positive result of the check of the identification code CO being obtained, the control device STE outputs, via a vehicle bus SPI, a corresponding unlocking signal OES for proper unlocking to a door control unit TSG. In this case, the vehicle bus can be, for example, a so-called "serial peripheral interface" (SPI) bus.

The door control unit TSG is supplied, as indicated, with the battery voltage Vbat by a vehicle-side battery via the vehicle electrical system or a vehicle-side power supply. If the door control unit TSG receives the proper unlocking signal OES, it will drive a motor MO of a door lock DL of the vehicle door FZT to unlock the vehicle door FZT or a corresponding locking mechanism. It is also conceivable that, in addition to the door control unit TSG of the vehicle door FZT, further door control units are caused to unlock the corresponding door locks in the case of possible further vehicle doors and thus to allow user access to the vehicle or to the passenger compartment of the vehicle.

In addition to this normal or correct operation, which takes place when the vehicle battery and thus the electrical system of the vehicle provide sufficient energy, emergency operation according to an embodiment of the present invention is also conceivable, in particular for performing unlocking.

For this purpose of initiating emergency operation, reference is now made again to the smartphone SP as the mobile identification transmitter of a user. This smartphone SP is able to execute a plurality of software-based applications (or "Apps"). By way of example, it is conceivable that a corresponding application can be started by means of one of the three buttons TA1, TA2 or TA3.

In this case, the buttons can be embodied as mechanical buttons or as so-called "soft keys" (touch-sensitive sections of a display device). For monitoring and for overview for a user, the smartphone SP furthermore comprises a display DSP, on which information concerning the application currently being executed can be seen. For example, it is conceivable that an application with the name "access" is started and executed by actuating the button TA1, the execution of the application "access" being confirmed on the display DSP, in particular. This is conceivable not only for emergency operation but also for correct operation that has been described above.

While it is possible that during correct operation, after the "access" application has been started, the smartphone SP has to be held against the door handle TG in order to exchange radio signals, it is conceivable that, during emergency operation, a user actuates the button TA2, for example, in order to activate emergency operation. However, it is also conceivable for the smartphone-side transceiver SES to independently activate emergency operation if, for example, it has not received a request signal CN from the vehicle-side antenna ANF within a certain time interval after starting the "access" application.

It is now assumed that the emergency operating function in the smartphone SP has been activated in one of the ways described above. Moreover, it is assumed, as shown in FIG. 1, that the smartphone SP is brought into the vicinity of the door handle TG by the user. In this case, the smartphone-side transceiver SES fed by a smartphone-side battery BAS will then transmit electromagnetic energy in the form of the radio signals CE in the direction of the vehicle-side antenna ANF. Said antenna thus serves as a first section of a vehicle-side energy supply device for receiving wirelessly transmitted energy and for converting the transmitted energy into electrical energy. The NFC reader NFF, which can be regarded as the vehicle-side energy supply device, in emergency operation, is then not operated as a reader, but rather in a transponder mode, in which it receives energy supplied (from the outside).

The NFC reader NFF also has a second section ALN which is used to charge a vehicle-side rechargeable electrical energy storage device SCH in the form of a supercapacitor or ultracapacitor. In the example, said supercapacitor SCH has a voltage of 5 volts and a capacitance of 3.3 F.

While the smartphone-side transceiver SES transmits high-energy radio waves CE (e.g. with a power of 100 mwatts) in the direction of the antenna ANF at regular (in particular short) time intervals (e.g. at intervals of 300-400 ms or else permanently for a specific time), this energy is converted further and the supercapacitor SCH is thereby charged. If a certain state of charge has been reached, the energy stored in the capacitor SCH can be used to supply energy to components of the access arrangement which are provided especially for emergency operation. In this case, a voltage output NVOUT of the NFC reader NFF is used to provide a voltage supply for an emergency operation control unit SEE via its voltage input SVIN, and a voltage supply for a charge trigger circuit CST via its voltage input CVIN.

Since the operation of the vehicle-side emergency control device SEE is now ensured via the supercapacitor SCH, it can begin to initiate an authentication process with respect to the smartphone SP. For this purpose, as above with regard to correct operation via the control device STE, a corresponding signal can also be output to the NFC reader NFF via the emergency control device SEE using a control line SLN1, which NFC reader thereupon begins to exchange request signals CN and response signals RN and to correspondingly exchange the identification code CO. The identification code CO transmitted by the smartphone can then be checked by an authentication section AU2 of the emergency control device SEE (corresponding to the authentication section AU1 of the control device STE). In this way, it is now conceivable that, despite failure of the on-board supply voltage of the vehicle, an authentication device in the form of the vehicle-side emergency control device SEE can be operated with the corresponding authentication section AU2 by charging a corresponding vehicle-side rechargeable electrical energy store SCH.

If the authentication section AU2 determines that the smartphone SP attached to the door handle TG is part of the access arrangement ZAO, since a comparison of the identification code CO sent with a response signal RN with a code FCO stored in the emergency control device SEE was positive, it will communicate this positive result of the check to the NFC reader NFF, which then applies an enable signal PS to an input SET of the charge trigger circuit CST. As a result of this enabling, the charge trigger circuit CST will apply a start signal NES to one input CEN of the charging circuit CCI.

A voltage V1 is applied to this charging circuit CCI at a further input IVIN, which voltage is provided by a vehicle-side charged energy storage device in the form of a battery BUB (back-up battery). A button cell, for example, which provides 3 volts as voltage V1, for example, can serve as such a battery BUB. The charging circuit CC1 also has a step-up converter AFW to step up the voltage V1 to a voltage V2 of 5 volts. When the start signal NES arrives at the input CEN, the charging circuit CCI begins its operation, that is begins to step up the voltage V1 to the voltage V2 and to provide this voltage V2 at the output IVOUT. This provided voltage V2 is then used to charge another vehicle-side rechargeable electrical energy storage device, likewise in the form of a capacitor or supercapacitor SCD.

The charge trigger circuit CST and the charging circuit CCI can together also be referred to as a charging control device LSE.

A monitoring circuit in the form of a comparator COMP monitors the charging of the supercapacitor SCD in this case. When a certain threshold voltage VREF is reached here, the comparator COMP notifies this termination of the charging process to the charge trigger circuit CST on the one hand by applying a corresponding termination signal BS to an input REST of the charge trigger circuit CST. This termination signal BS causes the charge trigger circuit to terminate the application of the start signal NES to the input CEN of the charging circuit CCI, so that the supercapacitor SCD is not charged further.

On the other hand, the termination signal BS at an input DEN of a switch DCS causes the latter to establish a connection between its voltage input DVIN, which is connected to the supercapacitor SCD, and its voltage output DVOUT. As a result of this continuous switching on of the switch DCS, the door lock DL or a corresponding actuator or motor MO is now operated in order to unlock the door lock or a corresponding locking mechanism, and thus also to unlock the vehicle door FZT in an emergency, and to allow a user to access the vehicle interior.

It should finally be noted again that, according to an access arrangement ZAO, a mechanical emergency key is no longer required in a mobile identification transmitter (smartphone). On the other hand, it is conceivable to enable emergency unlocking even in the event of total failure of the on-board power supply of the vehicle. Through the wireless supply of energy to the NFC reader and the emergency control device SEE directly or via the supercapacitor SCH on the one hand and by operating the vehicle-side unlocking device DL to actuate the locking mechanism MO supplied by the battery BUB, which is independent of the electrical system of the vehicle, safe operation of the vehicle-side unlocking device is possible.

Due to the fact that an already charged energy storage device is used with the battery BUB, only the emergency control device SEE will have to be charged during emergency operation by the NFC interface NFCS, with the energy of the battery BUB being able to be immediately used to charge the supercapacitor SCD for operation of the door lock or the unlocking device DL after positive authentication.

Finally, in the access arrangement according to the embodiment of the present invention, it should be mentioned that, for emergency operation (for externally supplying the emergency control device SEE), it is possible to use an everyday object (such as a smartphone) which is used by a user in everyday life and is usually carried by the user in a ready-to-use condition anyway.

The invention claimed is:

1. An access arrangement for a vehicle, comprising:
    a vehicle-side unlocking device configured to actuate a locking mechanism;
    a vehicle-side rechargeable electrical energy storage device configured to supply the unlocking device with energy;
    a vehicle-side charged electrical energy storage device configured to charge the vehicle-side rechargeable electrical energy storage device;
    a charging control device configured to control a charging process of the vehicle-side rechargeable electrical energy storage device by the vehicle-side charged electrical energy storage device;
    a vehicle-side authentication device configured to check an access authorization and control the charging control device depending on the checking of the access authorization.

2. The access arrangement as claimed in claim 1, wherein the vehicle-side charged electrical energy storage device comprises a galvanic cell.

3. The access arrangement as claimed in claim 1, wherein the vehicle-side rechargeable electrical energy storage device comprises a rechargeable battery or a capacitor.

4. The access arrangement as claimed in claim 1, wherein the charging control device comprises a DC-DC converter as a step-up converter configured to convert a first voltage provided by the charged vehicle-side electrical energy storage device into a second voltage, higher than the first voltage, configured to charge the vehicle-side rechargeable electrical energy storage device.

5. The access arrangement as claimed in claim 1 further comprising a vehicle-side energy supply device comprising:
    a first section configured to receive wirelessly transmitted energy and configured to convert the transmitted energy into electrical energy, and
    a second section configured to supply the vehicle-side authentication device with the electrical energy.

6. The access arrangement as claimed in claim 5 comprising a further vehicle-side rechargeable electrical energy storage device connected to the second section of the vehicle-side energy supply device and configured to be charged by the second section of the vehicle-side energy supply device.

7. The access arrangement as claimed in claim 6, wherein the further vehicle-side rechargeable electrical energy storage device is further configured to supply the vehicle-side authentication device with energy.

8. The access arrangement as claimed in claim 1, further comprising a vehicle-side energy supply device comprising a radio interface configured to receive energy transmitted wirelessly by radio.

9. The access arrangement as claimed in claim 1, further comprising a vehicle-side energy supply device comprising a light interface configured to receive energy transmitted wirelessly by light.

10. The access arrangement as claimed in claim 1, wherein the vehicle-side authentication device configured to implement the access authorization outputs an unlock signal configured to activate the vehicle-side unlocking device.

11. The access arrangement as claimed in claim 1 further comprising a mobile identification transmitter configured to output the energy to be wirelessly transmitted to a vehicle-side energy supply device.

12. The access arrangement as claimed in claim 11, wherein the mobile identification transmitter is further configured to carry out authentication with the vehicle-side authentication device.

13. The access arrangement as claimed in claim 11, wherein the mobile identification transmitter is comprised in at least one of a key, a key fob, a mobile phone, a smartphone and a fitness tracker.

14. The vehicle with the access arrangement as claimed in claim 1.

15. The access arrangement as claimed in claim 2, wherein the vehicle-side charged electrical energy storage device comprises a primary cell.

16. The access arrangement as claimed in claim 3, wherein the vehicle-side rechargeable electrical energy storage device comprises a supercapacitor.

17. The access arrangement as claimed in claim 8, wherein the vehicle-side energy supply device comprises an NFC interface.

18. The access arrangement as claimed in claim 9, wherein the vehicle-side energy supply device comprises a photocell.

* * * * *